(12) United States Patent
Gay et al.

(10) Patent No.: US 8,388,750 B2
(45) Date of Patent: Mar. 5, 2013

(54) GRANULATED KAOLIN COMPOSITIONS AND PROCESSES FOR THEIR PRODUCTION

(75) Inventors: Ernest Gay, Macon, GA (US); Jose Messias, Pará (BR); Sayre Mender, Milledgeville, GA (US); Robert J. Pruett, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 622 days.

(21) Appl. No.: 12/531,597

(22) PCT Filed: Mar. 20, 2008

(86) PCT No.: PCT/US2008/057745
§ 371 (c)(1),
(2), (4) Date: Nov. 5, 2009

(87) PCT Pub. No.: WO2008/116117
PCT Pub. Date: Sep. 25, 2008

(65) Prior Publication Data
US 2010/0107929 A1    May 6, 2010

Related U.S. Application Data

(60) Provisional application No. 60/896,163, filed on Mar. 21, 2007.

(51) Int. Cl.
*C04B 14/04* (2006.01)
*C04B 33/04* (2006.01)

(52) U.S. Cl. ...................................... 106/486; 501/144

(58) Field of Classification Search .................. 106/486; 501/144; 524/447
See application file for complete search history.

(56) References Cited

U.S. PATENT DOCUMENTS
4,059,453 A * 11/1977 Dittrich et al. ............... 106/38.3
(Continued)

FOREIGN PATENT DOCUMENTS
WO   WO 97/42268   11/1997
WO   WO 2008/116117 A1   9/2008

OTHER PUBLICATIONS

International Search Report and Written Opinion for International Application No. PCT/US2008/057745, Aug. 2008.

(Continued)

*Primary Examiner* — Pegah Parvini
(74) *Attorney, Agent, or Firm* — Finnegan, Henderson, Farabow, Garrett & Dunner, L.L.P.

(57) ABSTRACT

Disclosed herein are granulated kaolin compositions exhibiting at least one of improved material handling properties, low dusting during transit, easy make-down into mineral-water slurries, and requiring less energy to produce than spray dried kaolin products. The granulated kaolin compositions may, in one embodiment, be characterized by a moisture content ranging from about 12% to about 23% by weight relative to the total weight of the composition. In another embodiment, the granulated kaolin compositions may have an average granule size of greater than about 10 mesh. Also disclosed herein are granulated kaolin compositions having a moisture content ranging from about 12% to about 23% by weight relative to the total weight of the composition, wherein the composition is friable when subjected to a shear force. Further disclosed herein is a method for producing granulated kaolin compositions comprising mixing at least one kaolin slurry with at least one predispersed spray dried kaolin and agglomerating the resulting mixture. Still further disclosed herein is a system for producing granulated kaolin compositions comprising a first zone for mixing at least one kaolin slurry with at least one predispersed spray dried kaolin and a second zone for agglomerating the resulting mixture.

35 Claims, 1 Drawing Sheet

U.S. PATENT DOCUMENTS

| | | | |
|---|---|---|---|
| 4,246,220 A * | 1/1981 | Lamond et al. | 264/117 |
| 4,593,860 A | 6/1986 | Cook et al. | |
| 4,650,521 A * | 3/1987 | Koppelman et al. | 524/447 |
| 5,129,953 A | 7/1992 | Suitch et al. | |
| 5,328,506 A | 7/1994 | Crumbley et al. | |
| 5,364,579 A | 11/1994 | Dunaway et al. | |
| 6,805,821 B2 | 10/2004 | Phinney | |
| 7,883,552 B2 | 2/2011 | Lang et al. | |
| 2002/0150617 A1 | 10/2002 | Mergens et al. | |
| 2004/0186203 A1* | 9/2004 | Koyanagi | 524/17 |
| 2004/0220046 A1 | 11/2004 | Stockwell et al. | |
| 2005/0000393 A1 | 1/2005 | Virtanen | |
| 2006/0009348 A1* | 1/2006 | Sare et al. | 501/141 |
| 2006/0032405 A2 | 2/2006 | Jones et al. | |
| 2006/0121075 A1 | 6/2006 | Gilo et al. | |

OTHER PUBLICATIONS

Compton, Robert R., "Manual of Field Geology", John Wiley & Sons, Inc., 1962, pp. 212-215.

Fuerstenau, D. W.; Kapur, P. C.; and Mitra, A. K., "Dry Pelletization of Kaolin", Powder Technology, vol. 32, 1982, pp. 101-106.

* cited by examiner

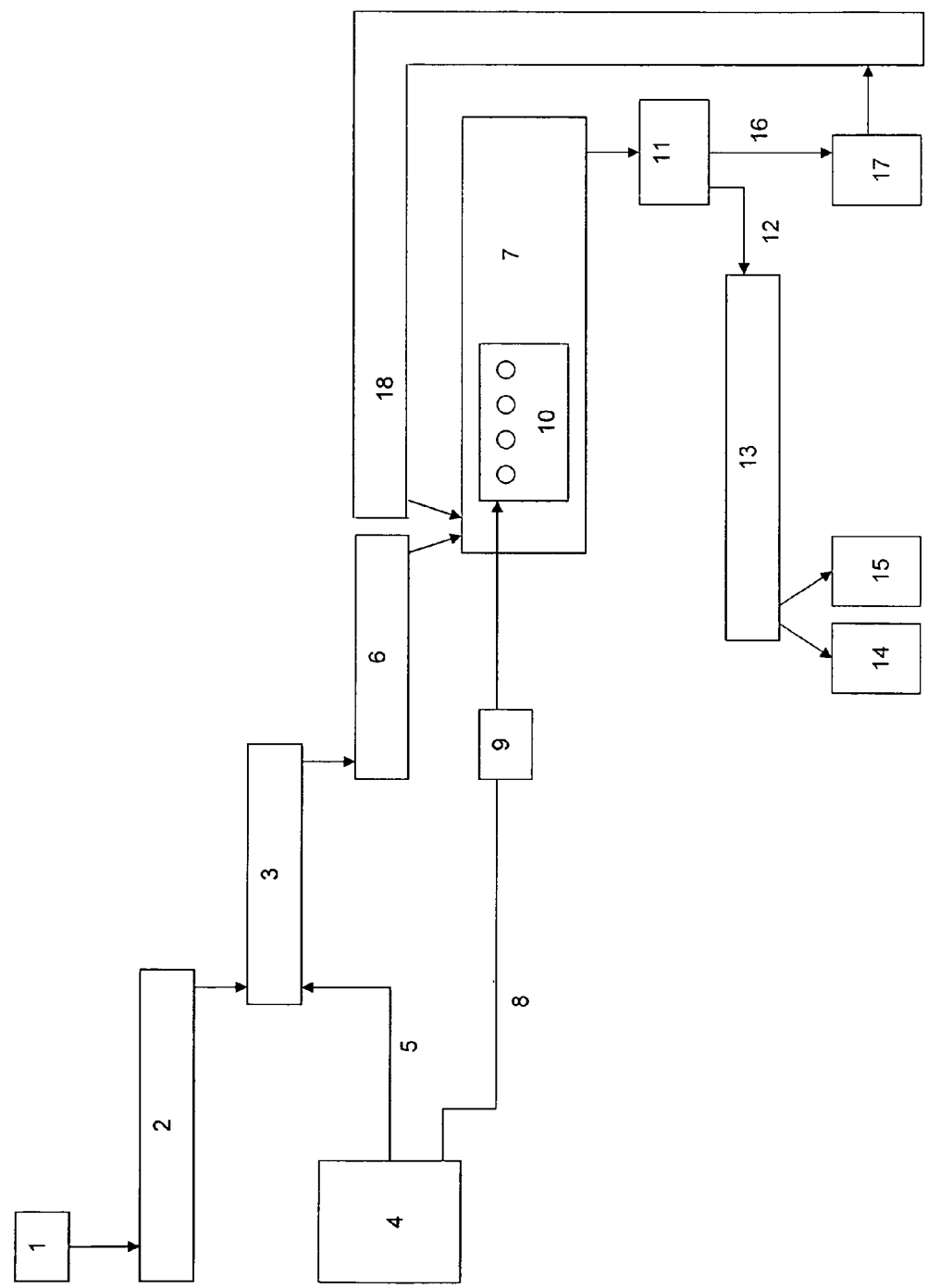

GRANULATED KAOLIN COMPOSITIONS AND PROCESSES FOR THEIR PRODUCTION

CLAIM OF PRIORITY

This application is a national stage entry of and claims the benefits and rights of priority to PCT International Application No. PCT/US2008/057745 filed Mar. 20, 2008, and claims priority to U.S. Provisional Application No. 60/896,163 filed Mar. 21, 2007, both of which are incorporated by reference herein in their entireties.

FIELD OF THE INVENTION

Disclosed herein are granulated kaolin compositions exhibiting at least one property chosen from improved material handling (e.g., ease of silo storage), low dusting during transit, and ease of make-down into mineral-water slurries. The granulated kaolin compositions may also require less energy to produce than other kaolin products, for instance spray dried kaolin products. The granulated kaolin compositions may be characterized by a moisture content ranging from 12% to 23% by weight relative to the total weight of the composition and an average granule size of greater than 10 mesh. Also disclosed herein are granulated kaolin compositions having a moisture content ranging from 12% to 23% by weight relative to the total weight of the composition, wherein the granules of said kaolin are friable when subjected to a shear force. Further disclosed herein is a method for producing granulated kaolin compositions comprising mixing a high solids kaolin slurry with a spray dried kaolin powder, and pelletizing/agglomerating the resulting mixture.

BACKGROUND OF THE INVENTION

Kaolin products are commonly used by the paper industry to fill and coat paper and paperboard products. These kaolin coatings and fillers may serve to improve the quality of the paper product, for instance, in terms of texture and surface characteristics and resulting in improved printing quality. Kaolin products are also used, for example, in the paint, plastics, and ink industries.

Kaolin is available in various types, for instance, calcined and hydrous types. The type of kaolin is typically selected by the user based upon the desired end product. Untreated kaolin is commonly referred to as "hydrous" because it has not undergone heating to remove hydroxyl groups generally present in its natural structure. Calcined kaolin compositions may be prepared by heating a kaolin clay to a temperature of at least 400° C., for example, a temperature ranging from 400° C. to 1100° C. Depending on the calcination temperature and residence time, the kaolin product may be rendered substantially anhydrous (fully calcined) or partially anhydrous (partially calcined), in which case the kaolin may be referred to as a metakaolin. As used herein, the term "kaolin" is meant to refer to all types of kaolin, including partially calcined kaolin, fully calcined kaolin, and hydrous kaolin.

Kaolin products are often sold to a manufacturer in the form of a pulverized low bulk density powder. That powder may be difficult to handle using conventional shipping methods as they may be dusty, resulting in wasted product and environmental contamination. The powders may also require the use of sparger cars, which are bulk-hopper railroad cars equipped with valves that allow water to be introduced to the kaolin powder upon arrival at the customer's facility. The water may be injected into the railcar and the mixture of kaolin powder and water is agitated by means of turbulence. However, this shipment method is both expensive and inconvenient in terms of handling.

Kaolin products have also been shipped in the form of pre-mixed slurries to avoid the problems associated with shipping low bulk density powders. However, those slurry shipments require specialized storage, shipping, and handling equipment. Furthermore, kaolin slurries may comprise from about 25 wt % up to about 50 wt % water and, thus, the expense of shipping these large volumes of water may become cost prohibitive.

Efforts have been made in the prior art to increase the bulk density of kaolin powders by forming cakes or bricks of kaolin products. Those cakes may be formed by filtering slurries of acid-flocculated kaolin through filter cloths to form a cake and then drying the cake. The cake may then be broken into smaller chunks or lumps and shipped in this form. Once at the customer's facility, the lump kaolin may be mixed with water to form a slurry. However, this lump form of kaolin often requires the use of high shear energy to liberate particles, the use of chemicals to adjust pH to near neutral, and the use of dispersants to enable stable high solids mineral-water slurries. Thus, this method often proves expensive in terms of energy consumption and the additional material cost of chemicals and dispersants.

Alternative methods in the prior art include spray drying of kaolin powders, for instance, as described in U.S. Pat. No. 5,129,953, which appears to convert clay slurries into small, low-moisture kaolin spheres. While this process may be an improvement over lump kaolin processing in terms of make-down, spray drying often produces kaolin products that are dusty, e.g., products having a large number of particles falling in a size range of less than 200 microns, for example less than 50 microns and by further example less than 10 microns. Thus, spray dried products may be difficult to ship, much like the pulverized kaolin powder products.

Kaolin products may also be shipped in pelletized/agglomerated form, for example, as described in U.S. Pat. Nos. 4,246,220 and 5,364,579; however, pelletization typically involves addition of up to 40 wt % water to form acceptable pellets. Thus, pelletized kaolin products typically result in increased shipping costs or require evaporation of a portion of the water before shipment, which affects production costs. Pellets have also been made using binders other than water; however, those pellets are often more expensive to produce and also may present difficulties when the customer attempts to dissolve the pellets in water for the desired end use.

Finally, efforts have been made in the prior art, for instance, U.S. Pat. No. 5,328,506 and PCT Publication No. WO 97/42268, to improve the bulk density and flowability of kaolin agglomerates, e.g., to improve their resistance to compaction during shipment and/or storage. However, those agglomerates still do not exhibit sufficiently improved handling properties in systems such as large silos due to high fines content.

Thus, it would be useful to provide granulated kaolin compositions exhibiting at least one property chosen from improved material handling, low dusting, and easy make-down into a mineral-water slurry, thereby allowing for at least one of more cost effective production, shipment, and handling of the kaolin products.

SUMMARY OF THE INVENTION

Disclosed herein are granulated kaolin compositions exhibiting at least one property chosen from improved material handling, low dusting, easy make-down in to mineral-water slurry, and requiring less energy to produce than spray dried kaolin products. In one embodiment, the granulated kaolin compositions are characterized by a moisture content ranging from 12% to 23% by weight relative to the total weight of the composition. In another embodiment, the granulated kaolin compositions have an average granule size of greater than about 10 mesh. In yet another embodiment, the granulated kaolin compositions are characterized by a moisture content ranging from about 12% to about 23% by weight relative to the total weight of the composition, and an average particle size of greater than about 20 mesh. In a further embodiment, the granulated kaolin composition comprises granules of kaolin that are friable when subjected to a shear force. The granulated kaolin may take on any shape, ranging from and including but not limited to very angular, to sub-rounded, to approximately spherical.

Further disclosed herein is a method for producing granulated kaolin compositions comprising mixing a high solids kaolin slurry with a predispersed spray dried kaolin powder. The process comprises mixing, which may be either high-shear or low-shear mixing, followed by agglomeration (also called granulation or pelletization) of the resulting mixture, either in the mixer or in a subsequent agglomerator or pelletizer, to form the granulated kaolin.

Still further disclosed herein is a method for producing granulated kaolin compositions comprising mixing a high solids kaolin slurry with a predispersed spray dried kaolin powder in a first zone of a drum agglomerator, and rolling and compacting the resulting mixture in a second zone of the drum agglomerator.

BRIEF DESCRIPTION OF THE FIGURES

FIG. 1 depicts one embodiment of a system for preparing the granulated kaolins compositions described herein.

DETAILED DESCRIPTION OF THE INVENTION

Granulated Kaolin

Kaolin starting materials may be at least one kaolin type chosen from partially calcined kaolin, fully calcined kaolin, and hydrous kaolin. In one embodiment, the at least one kaolin type is partially calcined kaolin. In another embodiment, the at least one kaolin type is fully calcined kaolin. In a further embodiment, the at least one kaolin type is hydrous kaolin. In yet another embodiment, the at least one kaolin is calcined kaolin in the form of metakaolin.

The at least one kaolin may be derived from any one or more of numerous kaolin production methods, either now known or hereafter discovered. Crude kaolin typically undergoes various well known separation and/or purification steps to improve various properties and/or remove any impurities, for example, to brighten the color of the kaolin. Either before, during, or after any separation and/or purification steps, the kaolin may be optionally heated (calcined) to produce a fully or partially anhydrous kaolin. It is also common to pulverize kaolin into powder so as to remove the larger abrasive particles. Typically, a pulverized powder substantially comprises −325 mesh (i.e., substantially all particles can pass through a filter fitted with a 325 mesh) or smaller particles. Examples of suitable commercial kaolin products for the at least one kaolin include, but are not limited to, CAPIM GP from Imerys Pigments, Inc., ALPHATEX from ECC, and NUCLAY, ANSILEX, ANSILEX 93, and SPECTRAFIL from Engelhard Corporation.

An at least one kaolin slurry may be prepared by mixing the at least one kaolin with water in proportions suitable for the desired application. In one embodiment, the kaolin slurry is a high solids slurry having, for example, a moisture content ranging from 25 wt % to 50 wt % kaolin relative to the total weight of the slurry. In another embodiment, the kaolin slurry has a moisture content ranging from 29 wt % to 40 wt % kaolin. In a further embodiment, the kaolin slurry is a low solids slurry having, for example, a moisture content ranging from 5 wt % to 20 wt % kaolin.

An at least one spray dried kaolin may be prepared by spray drying an at least one kaolin slurry. In one embodiment, the at least one spray dried kaolin has a moisture content ranging from 0 wt % to 20 wt %. In another embodiment, the moisture content ranges from 0 wt % to 8 wt %. In a further embodiment, the moisture content ranges from 0 wt % to 6 wt %. In yet another embodiment, the moisture content ranges from 1 wt % to 5 wt %.

The at least one spray dried kaolin may be predispersed. As used herein, "predispersed" means that the at least one spray dried kaolin contains at least one dispersant other than water. In one embodiment, the at least one predispersed spray dried kaolin has a pH of 7 when wetted with fresh water. In another embodiment, the at least one predispersed spray dried kaolin has a pH ranging from 6 to 8 when wetted with fresh water. The at least one dispersant may be chosen from any compound now known or hereafter discovered by the skilled artisan to effect at least one predispersed spray dried kaolin. In one embodiment, the at least one dispersant is chosen from polyacrylate polymers, maleic acrylic polymers, and polyphosphates. In another embodiment, the at least one dispersant is a polyacrylate polymer in the form of sodium polyacrylate. The at least one dispersant may be present in the at least one predispersed spray dried product in an amount ranging from 0.25 to 2.0 wt % relative to the total weight of the at least one predispersed spray dried kaolin.

The granulated kaolin compositions disclosed herein may further comprise at least one of additive. Appropriate additives are those now known or hereafter discovered to have a desired effect on the granulated kaolin composition. In one embodiment, the at least one additive is a binder other than water. Such a binder includes, but is not limited to, carboxy methyl cellulose, hydroxy ethyl cellulose, alginates, polyvinyl alcohol, polyvinyl pyrrolidone, and bentonites. In another embodiment, the at least one additive is a dispersant. Such a dispersant includes, but is not limited to, sodium polyacrylate; soda ash; and, condensed phosphates such as tetra-sodium pyrophosphate, sodium hexametaphosphate, and sodium tripolyphosphate. In a further embodiment, the at least one additive is a dispersant different from the at least one dispersant in the at least one predispersed spray dried kaolin. In yet another embodiment, the at least one additive is a mineral filler. Mineral fillers include, but are not limited to, talc, gypsum, diatomaceous earth, calcium carbonate, attapulgite, bentonite, montmorillonite, and other natural or synthetic clays. In yet a further embodiment, the at least one additive is an optical brightener. In still another embodiment, the at least one additive is a colorant chosen from dyestuffs and pigments. Such colorants include, but are not limited to, titanium dioxide.

The granulated kaolin compositions may be characterized by their moisture content, as measured in weight percent of the granulated kaolin relative to the total weight of the composition. In one embodiment, the moisture content ranges from 7 wt % to 23 wt %. In another embodiment, the moisture content ranges from 12 wt % to 22 wt %. In a further embodiment, the moisture content ranges from 15 wt % to 21 wt %. In yet another embodiment, the moisture content ranges from 17 wt % to 20 wt %.

The granulated kaolin compositions may also be characterized by the shape of the granulated kaolin therein, which may be any shape now known or hereafter discovered. In general, the shape of the granulated kaolin is determined by the processing method(s) employed. In one embodiment, the shape is angular. In another embodiment, the shape is sub-angular. In a further embodiment, the shape ranges from angular to sub-angular. In yet another embodiment, the shape is rounded. In yet a further embodiment, the shape is sub-rounded. In still another embodiment, the shape ranges from rounded to sub-rounded. In another embodiment, the shape is approximately spherical. In a further embodiment, the shape is generally determined by the agglomerating method employed.

The granulated kaolin compositions may further be characterized by their particle size when measured in an "as-is" solid or dry state. In one embodiment, less than 5% of the particles are smaller than 10 mesh (2 mm). In another embodiment, a majority of particles (i.e., more than 50%) are 7 mesh (2.83 mm) or larger. In yet another embodiment, the average particle size is greater than about 20 mesh. In a further embodiment, the average particle size is greater than 10 mesh. In yet another embodiment, the average particle size is greater than 7 mesh. In yet a further embodiment, the average particle size ranges from 10 mesh to 0.5 mesh (i.e., from 2 mm to 6.35 mm). In still another embodiment, the average particle size ranges from 10 mesh to 7 mesh.

In one embodiment, the granulated kaolin produced in accordance with the present disclosure (for example, using a pin mill and/or rotary drum) is characterized by a particle size with greater than 20 wt %-20 mesh particles and greater than 70 wt %-12 mesh particles. In another embodiment, the granulated kaolin may be screened after agglomeration (which may also be known as pelletization) to produce a particle size with greater than 30%+12 mesh particles and less than 20%-20 mesh particles. When screening is used in an embodiment of the present invention, any fines removed by screening may be recycled back to the mixing and/or agglomeration stage by any conventional means, such as a belt, bucket pneumatic, or screw conveyor.

In one embodiment, the granulated kaolin compositions of the present disclosure are friable when subjected to a shear force. As used herein, the term "friable" means that when the agglomerates are subjected to a shear force, such as a crushing force, they substantially disintegrate or crumble into a powder, rather than deforming in a plastic manner. In one embodiment, the granulated kaolin composition is friable at a moisture content ranging from 10 to 23 wt %. In another embodiment, the granulated kaolin composition is friable at a moisture content ranging from 14 to 20 wt %.

In another embodiment, the granulated kaolin compositions of the present disclosure are non-segregating. As used herein, the term "non-segregating" means that the chemical components making up the granulated kaolin composition are mixed into both the granules and any fines that may be present in the composition, such that even if size-based granule segregation occurs (for example, during transport), there is no segregation of the chemical components in the composition.

The granulated kaolin compositions disclosed herein may be particularly beneficial for shipment, in that the agglomerate characteristics disclosed herein may result in a product with a minimal amount of dust and/or a high bulk density. The flowability properties of the granulated kaolin composition may assist in effective storage and/or transportation. The dispersibility of the granulated kaolin composition may allow for a product that easily mixes with water and/or appropriately succumbs to pressure, so as to allow the granulated kaolin composition to disperse into kaolin particles suitable for use in an end product, such as a coating or filler.

Production Process

The granulated kaolin compositions of the present disclosure may be produced by mixing at least one kaolin slurry with at least one predispersed spray dried kaolin, and agglomerating the resulting mixture to form granules. The at least one kaolin slurry and the at least one spray dried kaolin may be combined in any weight ratio suitable to produce granulated kaolin compositions having the desired properties disclosed herein. In one embodiment, the weight ratio of the at least one kaolin slurry to the at least one spray dried kaolin ranges from 90:10 to 10:90. In another embodiment, the weight ratio ranges from 80:20 to 20:80. In a further embodiment, the weight ratio ranges from 70:30 to 30:70. In yet another embodiment, the weight ratio ranges from 60:40 to 40:60. In yet a further embodiment, the weight ratio is 50:50. For example, in one embodiment, an at least one kaolin slurry having a moisture content of 30% by weight can be mixed in a 1:1 ratio with at least one predispersed spray dried kaolin having a moisture content of 6% by weight to produce a granulated kaolin product having a moisture content of 18% by weight.

In one embodiment, the process for producing the granulated kaolin compositions of the present disclosure comprises:
(a) mixing at least one kaolin slurry with a moisture content of 25 wt % to 50 wt % and at least one predispersed spray dried kaolin with a moisture content of 0 wt % to 20 wt %; and
(b) agglomerating the resulting mixture to form granules.

In another embodiment, the process of the present disclosure comprises:
(a) mixing at least one kaolin slurry with a moisture content of 25 wt % to 50% and at least one predispersed spray dried kaolin with a moisture content of 0 wt % to 20 wt % in a first zone of a drum agglomerator; and
(b) agglomerating the resulting mixture to form granules in a second zone of the drum agglomerator.

The process of the present disclosure may be operated in any manner now known or hereafter discovered, for instance, continuous processes and semi-batch processes. The mixing may occur in a low shear mixing environment (such as slow speed paddle mixers and tumblers) or in a high shear mixing environment (such as turbolizers, pin mixers, and plow-shear mixers). The mixture may be granulated in the mixer or in a pelletizer/agglomerator separate from the mixer. In one embodiment, the mixture is granulated in the mixer in which the mixture of the at least one kaolin slurry and the at least one predispersed spray dried kaolin is created. In another embodiment, the mixture is granulated in a pelletizer/agglomerator separate from the mixer in which the mixture of the at least one kaolin slurry and the at least one predispersed spray dried kaolin is created.

Agglomerating may be accomplished using any of a number of devices now known or hereafter discovered for growth agglomeration. In one embodiment, the agglomerator is a pan pelletizer. In another embodiment, the agglomerator is a disc pelletizer. In a further embodiment, the agglomerator is a cone pelletizer. In yet another embodiment, the agglomerator is a drum pelletizer. In one embodiment in which the agglomerator is a drum pelletizer, the at least one kaolin slurry and the at least one spray dried kaolin are mixed together in a first zone of the drum agglomerator. In that first zone, the nucleation of the mixture to form granules may be initiated by the addition of the at least one kaolin slurry or water. The mixture, including the newly nucleated granules, may then be fed to a second zone of the drum agglomerator, in which the mixture is brought into contact with itself in a manner such that the mixture adheres to the nucleated granules, causing them to grow in size. In another embodiment in which the agglomerator is a drum agglomerator, the process of the present invention includes at least one step preceding the agglomerating, wherein the at least one kaolin slurry and the at least one spray dried kaolin are premixed together to form a premix that is then transferred to the first zone of the drum agglomerator. In a further embodiment, at least one additional amount of at least one kaolin slurry or water may be added to the mixture or premix in the first zone of the drum pelletizer. In yet another embodiment, agglomerating may be performed at a relative humidity of at least 50%.

Agglomerating may provide any one of several advantages, including strengthening and/or compaction of the pelletized/agglomerated product. Without wishing to be bound by theory, agglomerating is thought to occur via a process wherein the particles are first nucleated and then grow via mechanical action. Water and soluble salts in the water or slurry act as a binder that holds together fundamental particles and particle agglomerates. The water binder is at a level that enables agglomerate particles to crush in a friable manner, not in a plastic manner. That mechanical action may also advantageously act to compact and strengthen the agglomerates. In one embodiment, the process of the present disclosure produces agglomerates that disintegrate into a friable powder when subjected to a shear force (e.g., when they are crushed), rather than deforming in a plastic manner.

The form of the granulated kaolin composition may depend in part on the process type and/or equipment used. In one embodiment, in which mixing and granulating occurs in a single stage in a mixer, the granulated kaolin composition comprises a mixture of densified kaolin powder and kaolin granules. In another embodiment, in which mixing and granulating occurs in a high-throughput two-stage process, the granulated kaolin composition comprises a mixture of densified kaolin powder and kaolin granules, with kaolin slurry acting as a binder.

At least one of the mixing step and the agglomerating step may optionally comprise at least one of the group consisting of an additional amount of water, an additional amount of the at least one kaolin slurry, and an additional amount of a kaolin slurry different from the at least kaolin slurry. Merely for the sake of brevity, and without intending any loss of disclosure or scope, such an additional amount may be called "additional liquid" herein. In one embodiment, the additional kaolin slurry is chosen from low solids slurries of 50 wt % kaolin or less. In another embodiment, the additional kaolin slurry comprises 15 wt % to 50 wt % kaolin. In a further embodiment, the additional kaolin slurry comprises 15 wt % kaolin to 30 wt % kaolin. In yet another embodiment, the additional kaolin slurry is chosen from high solids slurries of 50 wt % kaolin or more.

The at least one additional liquid may be added in any quantity needed to achieve the intended product. In general, too great a quantity will "wet out" and cause the kaolin mixture to become oversaturated with the additional liquid to the point where the kaolin reaches it plastic limit, thus turning into mud. In general, too little a quantity may result in an undesirably higher fines content.

The at least one additional liquid may be added by any means appropriate to add the additional liquid to at least one of the mixing step and the agglomerating step. In one embodiment, the at least one additional liquid is poured into the step. In another embodiment, the at least one additional liquid is added using a controlled spray system with a low viscosity fluid to promote seeding and/or granule growth during agglomeration.

In one embodiment, the components of the controlled spray system are:
(a) A two stage Moyno pump capable of 100 psi, with gauges and shut off valves to restrict and measure flow rates;
(b) A mass flow meter with a 0 to 1 gallon range;
(c) 6 PulsaJet 10000 AUH-10 electric solenoid spray guns mounted on a spray bar capable of a flow rate of one gallon per minute each; and,
(d) an Auto Jet Spray system control unit that can turn the spray guns on and off.

Various spray tips may be used for the spray guns depending on the spray droplet size desired. In one embodiment, the spray system comprises spray tips that produce droplets of the additional liquid with a size roughly equal to the desired granule size. The pulse duration of the spray guns may, in some embodiments, range from 0.01 seconds to 0.3 seconds.

Following at least one of the mixing step and the agglomeration step, the granulated kaolin composition may optionally undergo at least one screening step. In one embodiment, screening is used to remove fine particles. In another embodiment, screening is used to move −10 mesh particles. In a further embodiment, screening is used to obtain a particularly desirable particle size distribution. If particles are removed by screening, the removed particles may optionally be recycled and added back to the process, for instance, prior to at least one of the mixing step and the agglomeration step.

Agglomeration System

Further disclosed herein is a system for producing a granulated kaolin composition of the present disclosure, wherein the system comprises:
(a) a first zone for mixing at least one kaolin slurry with a moisture content of 20 wt % to 50 wt % and at least one predispersed spray dried kaolin with a moisture content of 0 wt % to 20 wt %; and
(b) a second zone for agglomerating the resulting mixture to form granules.

In one embodiment, the first and second zones of the system may be substantially the same zone. In another embodiment, the first and second zones may be contained within the same piece of equipment. In a further embodiment, at least one of the first zone and the second zone is a low shear mixer. In yet another embodiment, at least one of the first zone and the second zone is a high shear mixer. In yet a further embodiment, the system of the present disclosure further comprises a third zone for screening the granules to remove fine particles, such as those having a size smaller than 10 mesh. In such an embodiment, the system optionally comprises a means for recycling the fine particles by adding them to at least one of the first zone and the second zone. Appropriate recycling means include any conventional recycling apparatus, including a belt, bucket pneumatic, or screw conveyor.

FIG. 1 illustrates one embodiment of a system for producing the disclosed granulated kaolin compositions. A predispersed spray dried kaolin 1 from a dryer or silo travels upon a belt conveyor 2 to a pin mixer 3. A kaolin slurry from tank 4 travels through conduit 5 to the pin mixer 3, where it is mixed with the predispersed spray dried kaolin. The mixture then travels upon a belt conveyor 6 to a drum agglomerator 7. An additional amount of the kaolin slurry from tank 4 travels through conduit 8 and electronic spray control 9, such that it is sprayed through spray guns 10 into the drum agglomerator 7. The drum agglomerator mixes the mixture from the pin mixer 3 with the additional amount of kaolin slurry from spray guns 10 and agglomerates the resulting mixture, which is then screened by the 10-mesh screen 11. The desired granulated kaolin composition 12 with a particle size of 10 mesh or more travels along belt conveyor 13 for storage either in flat store for silo storage 14 or product silo 15. The particles 16 with a particle size of less than 10 mesh pass to surge bin 17 and then travel along belt conveyor 18 for recycling into the drum agglomerator 7 as part of the mixture from the pin mixer 3 with the additional amount of kaolin slurry from spray guns 10.

Characterization of Granulated Kaolin

Angle of Repose

The angle of repose is the acute angle formed between the side of a cone-shaped pile of a material and the horizontal upon which it rests. The flatter the angle, the more flowable the material. Free flowing materials generally have an angle of repose of less than 40 degrees, for example, ranging from 25 to 40 degrees, whereas materials which do not flow freely typically exhibit an angle of repose of 70 degrees or more.

The angle of repose may be measured by placing a sample of material in a funnel with an opening large enough to let the largest particles of the sample through. The test is run by pouring the sample through the funnel onto a solid surface and then, without shaking or vibrating the surface, measuring (with a protractor or other suitable measuring device) the angle the cone-like pile forms with the horizontal.

The granulated kaolin compositions may be characterized by their angle of repose. In one embodiment, the angle of repose ranges from 25 to 55-degrees. In another embodiment, the angle of repose ranges from about 30 to about 50 degrees. In a further embodiment, the angle of repose is low enough that the desired bulk density of the granulated kaolin composition is achieved, but high enough to allow for the granulated kaolin composition to flow through desired and/or necessary openings and channels for effective storage and shipment.

Packed Bulk Density

Packed bulk density is determined by measuring the weight of a product filing a standard volume, after tapping the sample to remove air between the particles. The packed bulk density may be measured by placing a sample of material having a known weight into a graduated cylinder, tapping or vibrating the sample multiple times for a given period of time, and then measuring the volume taken up by the sample. Bulk density can then be calculated simply as weight divided by volume.

The granulated kaolin compositions may be characterized by their packed bulk density. In one embodiment, the packed bulk density ranges from 55 to 90 pds/ft$^3$. In another embodiment, the packed bulk density ranges from 60 to 70 pds/ft$^3$.

Compressibility

Compressibility may be correlated to the behavior of a material in a static state (e.g., in a silo). If the compressibility is low, for example, less than about 20%, the product flows freely. If the compressibility is high, for instance, greater than about 40%, the product packs and has a tendency to agglomerate in the static state.

The percent compressibility of a material may be defined by the following formula:

$$\frac{(\text{packed bulk density} - \text{aerated bulk density}) \times 100}{\text{packed bulk density}}$$

The measurements of packed bulk density and aerated bulk density may be calculated by standard methods using a Hosokawa micron powder tester. In one embodiment, the granulated kaolin composition has a percent compressibility of less than 20%. In another embodiment, the percent compressibility is less than 19%. In a further embodiment, the percent compressibility is less than 16%.

Cohesiveness

Cohesiveness is a measure of the amount of energy required to pull apart agglomerates of particles in a specified time. Cohesiveness may be correlated to the behavior of material in the dynamic state. Low cohesiveness, for example, 20% or less, reflects a material's ability to flow easily in transfer systems (e.g., improved flowability and floodability). High cohesiveness, for example, greater than 20%, may lead to material blockage or clogging in the transfer system. The measurements may be calculated using a Hosokawa micron powder tester.

Dispersibility

Dispersibility is an indication of the ease with which a material may be made down into a slurry. If the index for dispersibility is greater than 50%, for example, the material be prone to flushing. In one embodiment, the dispersibility index is at least 10%. In another embodiment, the dispersibility index is at least 15%. In a further embodiment, the dispersibility index is at least 20%. In yet another embodiment, the dispersibility index is less than 50%. In yet a further embodiment, the dispersibility index is less than 30%. In still another embodiment, the dispersibility index is less than 20%.

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, unless otherwise indicated the numerical values set forth in the specific examples are reported as precisely as possible. Any numerical value, however, inherently contains certain errors necessarily resulting from the standard deviation found in their respective testing measurements. Finally, the various titles and section headers used throughout the specification are presented merely for the convenience of the reader and are not intended to limit the disclosure.

By way of non-limiting illustration, examples of certain embodiments of the present disclosure are given below.

EXAMPLES

Examples 1-6

A kaolin slurry having a solids content of about 70% was mixed with a spray dried kaolin (SD) product having a moisture content of about 5% in an Attritor mixer at relatively high shear (900 rpm). Both the kaolin slurry and the spray dried kaolin product were a #1 coating kaolin having a particle size distribution of about 90% less than 2 microns when dispersed in water. The mixture was subsequently agglomerated in a Feeco 30" pan pelletizer. During pan agglomeration, a small amount (0.5-0.8 gpm) of additional kaolin slurry was sprayed into the rotating pan agglomerator. Various weight ratios of slurry to spray dried product were used, ranging from 10:90 to 60:40. The resulting granulated kaolin compositions were filtered using a 10 mesh screen. The particle sizes of the granules are given in Table I below:

TABLE I

| Example | Amount of Slurry (g) | Amount of SD product (g) | % +10 mesh particles | % −10 mesh particles |
|---|---|---|---|---|
| 1 | 10 | 90 | 9% | 91% |
| 2 | 20 | 80 | 15% | 85% |
| 3 | 30 | 70 | 22% | 78% |
| 4 | 40 | 60 | 28% | 72% |
| 5 | 50 | 50 | 29% | 71% |
| 6 | 60 | 40 | 34% | 66% |

As shown in Table I, a higher amount of +10 mesh particles were obtained using a weight ratio of slurry to spray dried product of 60:40, as in Example 6. However, any of the ratios employed in these Examples may be suitably used to form granulated kaolin compositions of the present disclosure, for example, by screening and recycling the −10 mesh particles.

The granulated kaolin composition of Example 6 had an angle of repose of 37 degrees. By comparison, the spray dried kaolin product by itself had an angle of repose of 32 degrees.

Examples 7-11

A kaolin slurry (Capim DG) having a solids content of about 70% was mixed with a spray dried kaolin product having a moisture content of about 1% using two-stage granulation process comprising mixing followed by agglomeration using a drum pelletizer.

The mixing step was a blending operation. A blend of spray dried kaolin and slurry kaolin was fed into a Feeco 10 inch pin mill model #10-56 (operating at 800 to 900 rpm) at a 50/50 ratio (wet/wet) of spray dried kaolin to kaolin slurry, with a possible +/−10% variation in the ratio. A dry, solid mixture having between 14 to 16% moisture content was produced.

The second step of the granulation process was accomplished using a Feeco rotary drum acting as an agglomerator, 30 inches in diameter by 9 feet in length. Inside the rotary drum the solid mixture from the pin mill was allowed to cascade in the first zone of the drum while the drum was rotated at 16 rpm. Additional kaolin slurry was sprayed into the cascading mix, at a position extending from the feed side of the drum to a position approximately 40 inches down the length of the drum, to promote particle agglomeration and granule growth. The drum was positioned at an angle such that the drum dropped ¼ inch every foot in length.

The spray system comprised:
(a) A two stage Moyno pump capable of 100 psi, with gauges and shut off valves to restrict and measure flow rates;
(b) A mass flow meter with a 0 to 1 gallon range;
(c) 6 PulsaJet 10000 AUH-10 electric solenoid spray guns mounted on a spray bar capable of a flow rate of one gallon per minute each; and,
(d) an Auto Jet Spray system control unit to turn the spray guns on and off.

The pulse duration of the spray guns ranged from about 0.01 seconds to about 0.3 seconds. The amount of spray needed was controlled to a desired value. The amount of slurry sprayed inside the drum was estimated by a mass balance model to achieve the desired product moisture content of approximately 18 wt % to 21 wt %. During agglomeration, the drum agglomerator was monitored to ensure the consistency of the final product particle size, to track the product fines content, and to avoid "wetting out" the drum. Agglomeration was found to proceed more effectively at higher ambient humidity of at least 50%.

After spraying, the granules were nucleated by the spray and allowed to grow via tumbling as they progressed through the second zone of the drum. In effect, the material in the second section rolled over on itself causing granules to grow, accumulating powder as they rolled in a manner similar to a snow ball rolling down hill. The slurry also acted as a binder to make larger granules.

The granulated product was discharged from the drum and screened using a 10 mesh vibrating screen to separate the coarse granules from the fines. The coarse product was the desired granulated product. The fines were recirculated back to the rotary drum by means of a conveyor belt and feed auger.

The properties of the resulting granulated kaolin compositions are illustrated below in Tables II and III.

TABLE II

| | Example 7 | Example 8 | Example 9 | Example 10 | Example 11 |
|---|---|---|---|---|---|
| wt % moisture | 21.0 | 20.7 | 20.7 | 18.6 | 21.0 |
| | wt % < mm | wt % < mm | wt % < mm | wt % < mm | wt % < mm |
| +.5 mesh | 100.0% | 100.0% | 100.0% | 101.4% | 100.0% |
| +4 mesh | 87.2% | 91.6% | 67.4% | 96.4% | 73.7% |
| +6 mesh | 61.3% | 66.3% | 49.3% | 80.8% | 51.2% |
| +7 mesh | 48.5% | 49.0% | 39.8% | 67.4% | 39.2% |
| +10 mesh | 31.8% | 26.9% | 26.4% | 41.7% | 21.9% |
| +12 mesh | 26.4% | 18.6% | 18.7% | 26.3% | 12.7% |
| +20 mesh | 12.4% | 5.7% | 8.0% | 5.7% | 2.4% |
| +40 mesh | 6.7% | 3.1% | 5.2% | 4.0% | 1.6% |
| +100 mesh | 2.4% | 1.2% | 2.4% | 2.0% | 0.8% |
| +325 mesh | 0.4% | 0.2% | 0.4% | 0.4% | 0.2% |
| −325 mesh | 0 | 0 | 0 | 0 | 0 |
| % +20 mesh | 87.6% | 94.3% | 92.0% | 95.7% | 97.6% |

TABLE III

| Sample | Angle of Repose (deg.) | Packed Bulk Density (g/cc) | Compressibility (%) |
|---|---|---|---|
| Example 7 | 40.1 | 1.135 | 12.9 |
| Example 8 | 38 | 1.098 | 14 |
| Example 9 | 42.5 | 1.104 | 16.9 |

TABLE III-continued

| Sample | Angle of Repose (deg.) | Packed Bulk Density (g/cc) | Compressibility (%) |
|---|---|---|---|
| Example 10 | 40.5 | 1.012 | 15.8 |
| Example 11 | 40.5 | 1.074 | 13.6 |

What is claimed is:

1. A granulated kaolin composition having a moisture content ranging from about 12% to about 23% by weight relative to the total weight of the composition and an average particle size of greater than about 20 mesh.

2. The composition of claim 1, wherein the composition has an angle of repose ranging from about 25 to about 40 degrees.

3. The composition of claim 1, wherein less than 15% of the composition has a particle size smaller than 10 mesh.

4. The composition of claim 1, wherein the composition has a packed bulk density ranging from about 55 to about 90 pds/ft$^3$.

5. The composition of claim 1, wherein the composition comprises at least one kaolin form chosen from fully calcined kaolin, partially calcined kaolin, and hydrous kaolin.

6. The composition of claim 1, wherein the composition is friable when subjected to a shear force.

7. A granulated kaolin composition having a moisture content ranging from about 12% to about 23% by weight relative to the total weight of the composition, wherein the composition is friable when subjected to a shear force, wherein less than 15% of the composition has a particle size smaller than about 10 mesh.

8. The composition of claim 7, wherein the composition has an angle of repose ranging from about 25 to about 40 degrees.

9. The composition of claim 7, wherein the composition has a packed bulk density ranging from about 55 to about 90 pds/ft$^3$.

10. The composition of claim 7, wherein the composition comprises at least one kaolin form chosen from fully calcined kaolin, partially calcined kaolin, and hydrous kaolin.

11. The composition of claim 7, wherein the composition has an average particle size of greater than about 20 mesh.

12. A process for producing a granulated kaolin composition, comprising:
(a) mixing at least one kaolin slurry with a moisture content of about 20 wt % to about 50 wt % and at least one predispersed spray dried kaolin with a moisture content of 0 wt % to about 20 wt %; and
(b) agglomerating the resulting mixture to form granules, wherein the composition has a moisture content ranging from about 12% to about 23% by weight relative to the total weight of the composition and an average particle size of greater than about 20 mesh.

13. The process of claim 12, wherein the at least one predispersed spray dried kaolin comprises at least one dispersant chosen from polyacrylate polymers, maleic acrylic polymers, and polyphosphates.

14. The process of claim 13, wherein the at least one dispersant is present in the at least one predispersed spray dried kaolin in an amount ranging from about 0.25 to about 2.0 by weight relative to the total weight of the at least one predispersed spray dried kaolin.

15. The process of claim 12, wherein during the mixing step, the mixture is nucleated into granules by the addition of the at least one predispersed spray dried kaolin.

16. The process of claim 12, wherein during the palletizing step, the granules are contacted with the mixture such that the mixture adheres to the granules and causes the granules to grow in size.

17. The process of claim 12, wherein the ratio of the at least one kaolin slurry to the at least one predispersed spray dried kaolin ranges from about 80:20 to about 20:80.

18. The process of claim 12, wherein the at least one kaolin slurry comprises at least one kaolin in an amount ranging from about 60 to about 80 wt % relative to the total weight of the slurry.

19. The process of claim 12, wherein the at least one predispersed spray dried kaolin comprises at least one kaolin in an amount ranging from about 90 to about 100 wt % relative to the total weight of the predispersed spray dried kaolin.

20. The process of claim 12, wherein the mixing and agglomerating occur in a single stage.

21. The process of claim 12, wherein the mixing and agglomerating occur in separate stages.

22. The process of claim 12, wherein the mixing step and optionally the agglomerating step occurs in a mixer chosen from a low shear mixer and a high shear mixer.

23. The process of claim 22, wherein the low shear mixer is chosen from a slow speed paddle mixer and a tumblers.

24. The process of claim 22, wherein the high shear mixer is chosen from a turbolizer, a pin mixer, and a plow-shear mixer.

25. The process of claim 12, wherein the agglomerating occurs in a pelletizer chosen from a pan pelletizer, a disc pelletizer, a cone pelletizer, and a drum pelletizer.

26. The process of claim 12, further comprising adding, during the agglomerating step, at least one of the group consisting of an additional amount of water, an additional amount of the at least one kaolin slurry, and an additional amount of a kaolin slurry different from the at least one kaolin slurry.

27. The process of claim 12, further comprising screening the granules to remove fine particles having a size smaller than 10 mesh.

28. The process of claim 27, further comprising recycling the fine particles by adding them to at least one of the mixing step and the agglomerating step.

29. A process for producing a granulated kaolin composition, comprising:
(a) mixing at least one kaolin slurry with a moisture content of about 20 wt % to about 50 wt % and at least one predispersed spray dried kaolin with a moisture content of 0 wt % to about 20 wt % in a first zone of a drum pelletizer; and,
(b) agglomerating the resulting mixture to form granules in a second zone of the drum pelletizer, wherein the composition has a moisture content ranging from about 12% to about 23% by weight relative to the total weight of the composition and an average particle size of greater than about 20 mesh.

30. The process of claim 29, further comprising screening the granules to remove fine particles having a particle size smaller than 10 mesh, and recycling the fine particles by adding them to the first zone of the drum pelletizer.

31. A process for producing a granulated kaolin composition, comprising:
(a) premixing at least one kaolin slurry with a moisture content of about 20 wt % to about 50 wt % and at least one predispersed spray dried kaolin with a moisture content of 0 wt % to about 20 wt %;
(b) introducing the premixture to a first zone of a drum pelletizer;

(c) adding an additional amount of the at least one predispersed spray dried kaolin to the first zone; and,
(d) agglomerating the resulting mixture to form granules in a second zone of the drum pelletizer,
wherein the composition has a moisture content ranging from about 12% to about 23% by weight relative to the total weight of the composition and an average particle size of greater than about 20 mesh.

32. The process of claim 31, wherein the premixing occurs in a pan pelletizer.

33. A system for producing a granulated kaolin composition, comprising:
(a) a first zone for mixing at least one kaolin slurry with a moisture content of 20 wt % to 50 wt % and at least one predispersed spray dried kaolin with a moisture content of 0 wt % to 20 wt %; and,
(b) a second zone for agglomerating the resulting mixture to form granules,
wherein the composition has a moisture content ranging from about 12% to about 23% by weight relative to the total weight of the composition and an average particle size of greater than about 20 mesh.

34. The system of claim 33, further comprising a third zone for screening the granules to remove fine particles having a size smaller than 10 mesh, and optionally, at least one means for recycling the fine particles by adding them to at least one of the first zone and the second zone.

35. A system for producing a granulated kaolin composition, comprising:
(a) a mixer for mixing at least one kaolin slurry with a moisture content of about 20 wt % to about 50 wt % and at least one predispersed spray dried kaolin with a moisture content of 0 wt % to about 20 wt %;
(b) a spray system for adding an additional amount of the at least one kaolin slurry to the mixture from the mixer;
(c) a drum agglomerator for agglomerating the sprayed mixture into the granulated kaolin composition; and,
(d) a screen to remove particles having a size smaller than about 10 mesh from the granulated kaolin composition,
wherein the composition has a moisture content ranging from about 12% to about 23% by weight relative to the total weight of the composition and an average particle size of greater than about 20 mesh.

* * * * *